United States Patent [19]
Walker

[11] Patent Number: 5,082,341
[45] Date of Patent: Jan. 21, 1992

[54] INTEGRATED OPTICAL DEVICE WITH ZERO-GAP AND WELL-SPACED REGIONS

[75] Inventor: Robert G. Walker, Northampton, England

[73] Assignee: GEC-Marconi Limited, England

[21] Appl. No.: 638,203

[22] Filed: Jan. 4, 1991

[30] Foreign Application Priority Data

Jan. 6, 1990 [GB] United Kingdom ............... 9000318

[51] Int. Cl.[5] ............................ G02B 6/10; G02B 6/00
[52] U.S. Cl. ....................................... 385/14; 385/42; 385/129
[58] Field of Search ........................... 350/96.11–96.14

[56] References Cited

U.S. PATENT DOCUMENTS 4,669,815 6/1987 Thaniyavarn .................... 350/96.15
4,917,449 4/1990 Granestrand .................... 350/96.14
4,961,619 10/1990 Hernandez-Gil et al. ... 350/96.14 X

FOREIGN PATENT DOCUMENTS

WO89/03055 4/1989 PCT Int'l Appl. ............... 350/96.14

Primary Examiner—Akm Ullah
Attorney, Agent, or Firm—Kirschstein, Ottinger, Israel & Schiffmiller

[57] ABSTRACT

An integrated optical device including a direction coupler between first and second waveguides whereby to transfer light energy between the first and second waveguides, the directional coupler including a first region in which the first and second waveguides converge towards one another while the electromagnetic field regions associated with the waveguides interact, and a second region in which the first and second waveguides are merged into a single waveguide structure having at least twice the width of the first or second waveguide, the first and second regions being dimensioned to control or eliminate the dependence of the directional coupler upon polarization of light in the waveguides.

4 Claims, 5 Drawing Sheets

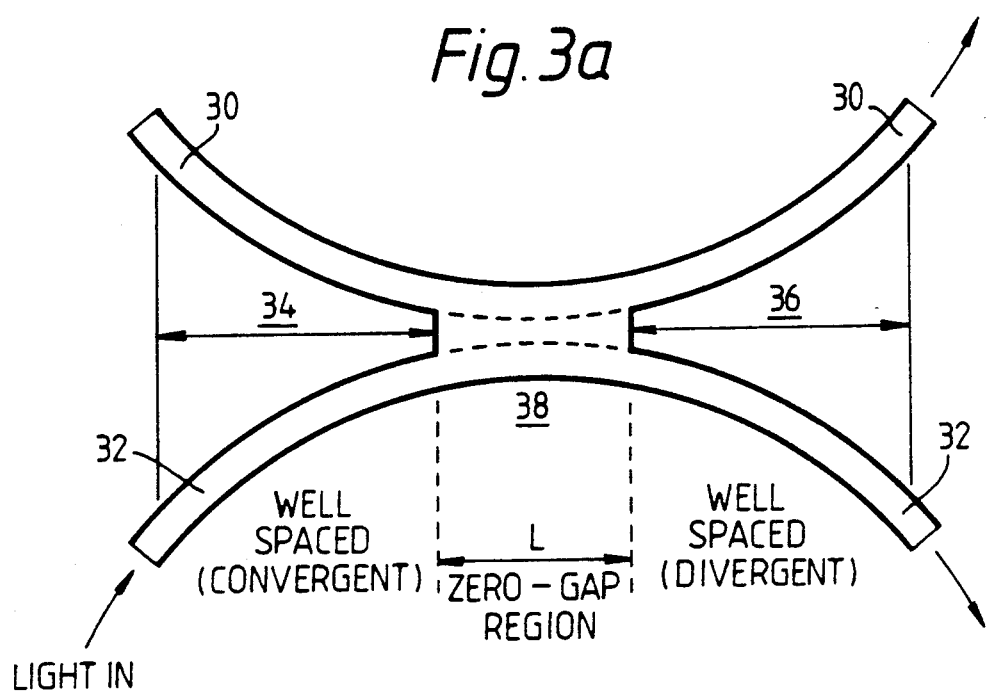
Fig.3a
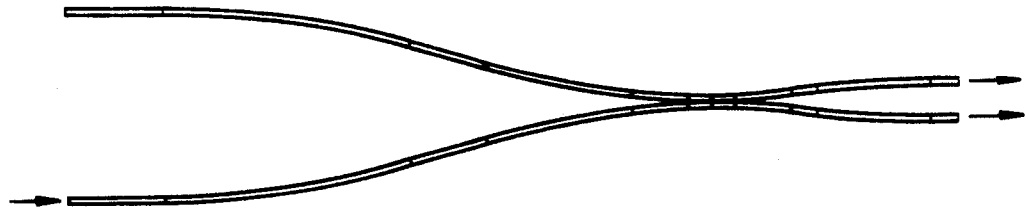
Fig.3b
Fig.3.

INTEGRATED OPTICAL DEVICE WITH ZERO-GAP AND WELL-SPACED REGIONS

FIELD OF THE INVENTION

This invention relates to integrated optical devices incorporating directional coupling arrangements.

BACKGROUND ART

Optical waveguide directional couplers are well-known and much-relied-on sub-components for integrated opto-electronic devices. Being an analogue of the bulk-optics semi-transparent mirror, they provide a means for apportioning light between (or remixing) two paths and any split-ratio (the most common being 50:50) can be obtained.

The standard directional coupler consists of two optical waveguides which run parallel, and sufficiently close together for their guided fields to interact, for a distance L before diverging to stop the interaction. The coupling coefficient (k) is a falling exponential function of the waveguide spacing and varies strongly with the waveguide confinement factor (which is an expression of the degree to which the radiation energy is confined with the waveguide channel)—itself a sensitive function of almost every waveguide parameter.

This sensitivity is a major problem with the use of such couplers. It makes device performance quite unpredictable and uncontrollable in practice unless the couplers are tuned interactively at some stage in manufacture.

An example of such tuning concerns GaAs/AlGaAs waveguide devices as shown in FIG. 6. Such waveguide is of the rib type having a rib 2 formed in a layer 4 of AlGaAs. Layer 4 is disposed on a layer 6 of GaAs, forming a guide layer, which in turn is disposed on a substrate 8 of AlGaAs. The confinement factor—and hence coupling coefficient—is sensitive to the residual thickness δ of the AlGaAs layer 4 into which the rib 2 has been etched: i.e. a composite function of rib height and original layer thickness, both of which quantities are subject to random variations in standard processing (a nominal accuracy of 10% is usually asserted). Since facets must be formed for optical input/output, the test cannot be done in-situ; thus tuning involves cleaving a test-piece out of the wafer and launching light through a test directional coupler. Wet chemical etchant is then dropped onto the test piece and the variation of output levels monitored until the desired condition reached when it is quickly rinsed. Simply timing this etching and then treating the rest of the wafer similarly, frequently gives uneven results due to non-uniformity of the wafer. For best results each individual device must be tuned separately—clearly unacceptable in production. InP waveguides for opto-electronic integration have proved more difficult to wet-etch; thus such tuning is more difficult, while the integrated nature of the device demands a high yield of good, well-tuned couplers made by 'dead-reckoning'.

A second problem is that directional couplers are sensitive to the optical polarization. TM (E normal to the surface) gives a larger confinement factor than TE (E parallel to the surface) which can amount to a ×2 different in the coupling coefficient. This is unacceptable if the light is remote sourced via standard optical fibre which inevitably scrambles the polarization.

A third problem is the physical length (L) of the parallel-waveguide section which frequently exceeds 1 mm if the guide spacing is sufficient to ensure that it survives photolithographic reproduction (>2 μm), this aggravates problems in the variation of thickness of the residual thickness of layer 4 of FIG. 6.

The coupling phenomenon is most readily and accurately viewed as an interference between the two modes of a composite guiding system.

Referring to FIG. 1, a composite guiding system comprises as shown in FIG. 1a two spaced waveguides comprising ribs 10, 12 of width W, formed in a layer 14 of InP and spaced by a gap g. The major part of the radiation is guided in an underlying layer 16 of InGaAsP. The symmetric and anti-symmetric modes (FIG. 1a) have amplitude maxima which are in-phase in one waveguide (adding) but in anti-phase in the other (cancelling). Some distance (Lo=π/2; known as the coupler transfer length) down-guide this phase relationship will have reversed since the modes travel with slightly different velocities. This results in cancellation in the first guide 10 but reinforcement in the second 12; all the light has coupled over and continues to couple back and forth in a spatially sinusoidal manner.

As the gap between the inner edges of the guides is progressively reduced to zero, the modal velocities become increasingly different and the transfer becomes more rapid spatially. At zero gap the modes are just the fundamental and first-order modes of a double-width waveguide 20 (FIG. 1b); however they interfere in the same way and light input to one side of such a waveguide will excite both modes and will swing from side to side of the waveguide with a spatial period readily predictable from the waveguide parameters.

Such zero-gap or TMI (Two Mode Interference) of BOA (Bifurcation Optique Active) couplers are well known but are usually made relatively long (many beat-lengths) in order to emphasize the wavelength sensitivity of the coupling to obtain a wavelength diplex function.

SUMMARY OF THE INVENTION

It is an object of the present invention to provide a directional coupler in an integrated optical device which can be manufactured with precisely determined characteristics and which does not require subsequent tuning, wherein the polarisation sensitivity can be controlled or eliminated, and which is an overall compact structure.

The present invention is based on the realisation that in the spaced waveguide structure shown in FIG. 1a, the transfer coupler length (Lo) exhibits a first dependence upon polarisation and residual thickness of the upper waveguide layer with Lo being shorter for transverse electric fields than for transverse magnetic fields and shorter for increased residual thickness, whereas in the double width waveguide structure the transfer coupler length exhibits a second dependence upon polarisation and residual thickness opposite to said first dependence. Thus by providing a directional coupler as appropriately dimensioned regions of a spaced waveguide structure and a double width waveguide structure, it is possible to control the dependence upon polarisation and residual thickness and to eliminate such dependence.

The present invention provides an integrated optical device including a directional coupler between first and second waveguides whereby to transfer light energy between the first and second waveguides, the directional coupler including a first region in which the first and second waveguides converge towards one another while the electromagnetic field regions associated with the waveguides interact, and a second region in which the first and second waveguides are merged into a single waveguide structure having at least twice the width of the first or second waveguides, the first and second regions being dimensioned to control or to eliminate the dependence of the directional coupler upon polarisation of light in the waveguides.

The waveguides may converge together in any convenient manner, for example as straight lines or as curves, either curving in the same or opposite directions. As preferred the waveguides converge as curves which curve in opposite directions in order to make the transition between spaced and non-interactive waveguides to interactive waveguides in a short overall length and thereby decrease the length of said first region. The contribution $\Delta L(FR)$ to coupler transfer length created by said first region may be predetermined as follows:

$$\Delta L(FR) \alpha 2 \cdot \int_{\infty}^{S.R.} \frac{dx}{k(x)}$$

where $k(L)$ is the coupling coefficient, which is a function of the distance x from the second region (SR). The factor 2 arises from the assumption that the first and second waveguides will diverge from the second region in an opposite manner to their convergence; this may not be necessarily true in all circumstances.

The contribution $\Delta L(SR)$ of the second region to transfer coupler length may be predetermined as follows:

$$\Delta L(SR) \alpha \frac{x}{k}$$

where x is the length of the second region.

In addition the lengths $\Delta L$ will be dependent upon the polarisation. The lengths will normally be chosen such that $$\Delta L(FR)_{TE} - \Delta L(FR)_{TM} = \Delta L(SR)_{TM} - \Delta L(SR)_{TE}.$$

BRIEF DESCRIPTION OF THE DRAWINGS

A preferred embodiment of the invention will now be described with reference to the accompanying drawings, in which:

FIG. 3(a) and (b) is a plan view of a preferred embodiment of a directional coupler according to the invention;

DESCRIPTION OF THE PREFERRED EMBODIMENT

Figure 1:
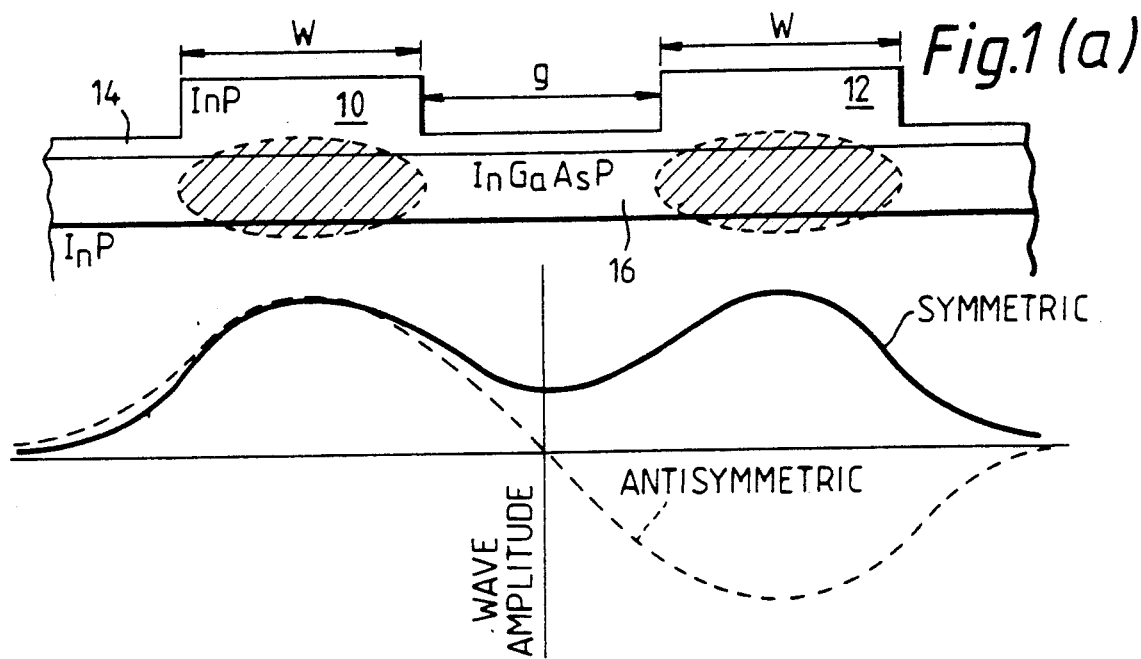
FIG. 1(a) and (b) is schematic view of modes of light transmission in waveguide coupled and double width waveguide constructions.
Figure 1:
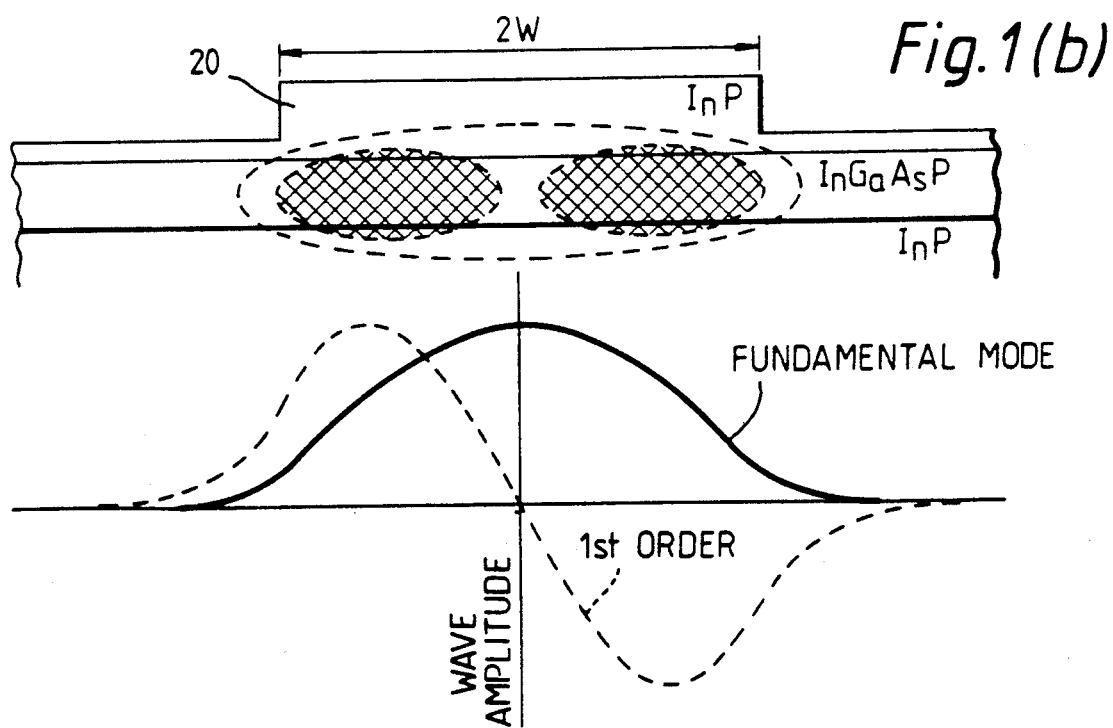
Figure 2:
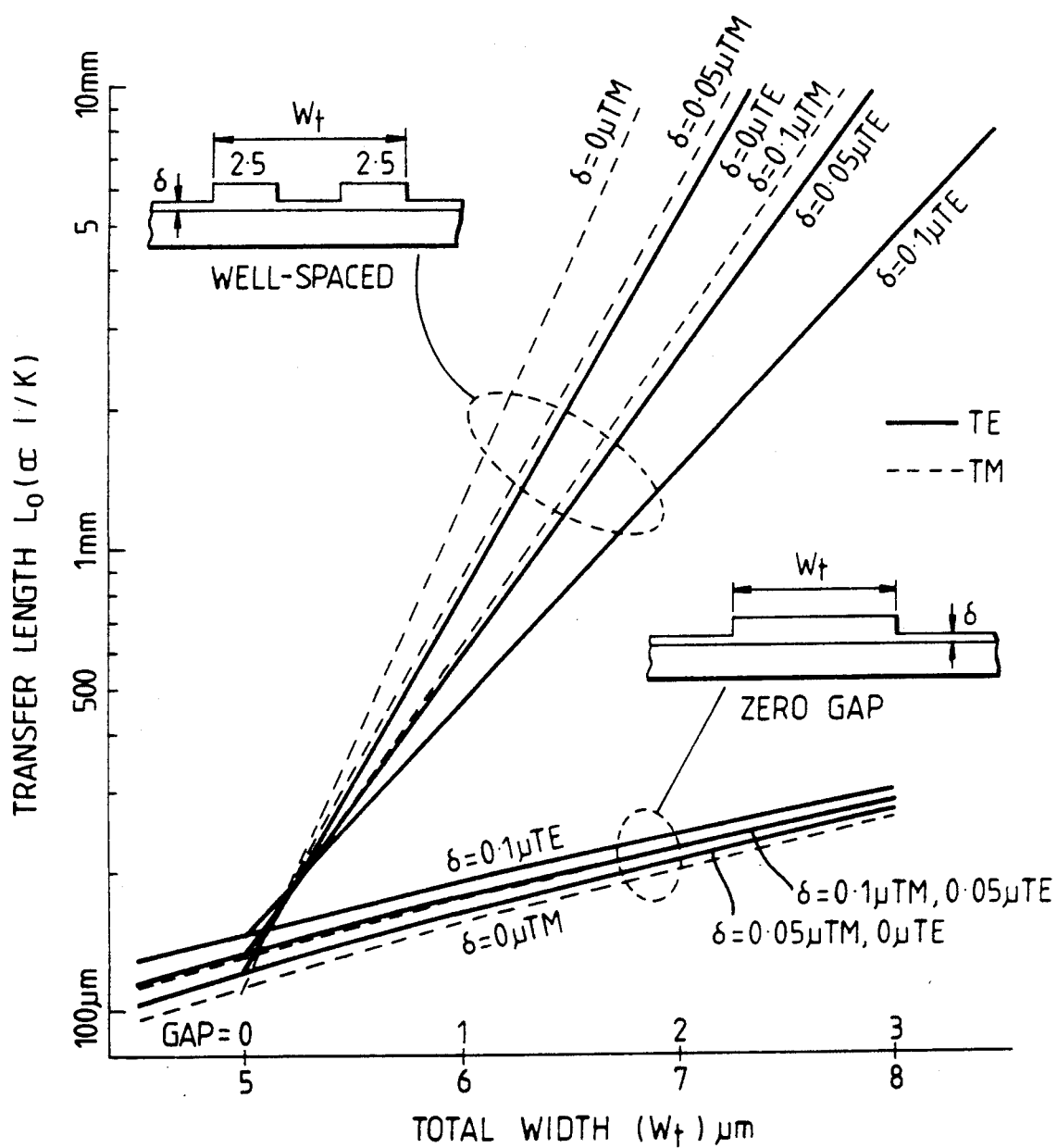
FIG. 2 is a graph showing the dependence of the coupler transfer length (Lo) of the structures of FIG. 1 on polarisation (TE/TM) and the residual thickness ($\delta$) of the upper waveguide layer.

Referring now to FIG. 2, this clearly shows that the well-spaced' and 'zero-gap' types of coupler have sensitivities to polarization and (in this case) the etch-depth of the waveguide rib, which are of opposite sign. Substantial amounts of 'well-spaced' type coupling are inevitably contributed by the converge/diverge sections at each end of any coupler. This turns out to be more than sufficient, in combination with a short 'zero-gap' region to balance out the opposite sensitivity to polarization and waveguide parameters of the latter.

FIG. 3 illustrates a preferred embodiment of a directional coupler according to the invention comprising a 50:50 splitter.

In FIG. 3a, the coupler comprises two spaced waveguide sections 30, 32 formed as ribs 2.5 $\mu$m wide in InP/InGaAsP. The sections 30, 32 are formed as arcs of circles 3 or 4 mm in radius and the arcs converging together in "weak coupling" regions 34, 36 towards a central region 38 in which the sections 30, 32 are merged in a single double width waveguide structure ~5.5 $\mu$m wide and 30-90 $\mu$m long. At the edges of region 38, waveguides 30, 32 are spaced apart 1 $\mu$m, which is the minimum distance which can presently be resolved by fabrication techniques in common use. In order to minimise the 'well-spaced' coupling from the curved sections, the 'zero-gap' region is constructed by filling-in the gap between continuous circularly arcuate waveguides in the region of their closest approach. The structure is symmetrical about an axis through the centre of the gap. This structure ensures that at the onset of 'well-spaced' behaviour the guides are already diverging at some finite rate, which reduces the total contribution from this region.

The 'filling' is, of course, done at the mask design stage and is a fiction which is useful for geometrical construction and for illustration of the same. The real waveguides do not acquire a gap at their closest approach which is subsequently filled. It should be noted that if an attempt were made to make the waveguides 30, 32 approach closer than 1 $\mu$m, this would not be accurately reproducible with common fabrication techniques and would lead to uncertainties in the properties of the coupler.

With the dimensions indicated, light entering from one waveguide section is split 50:50 into both waveguide sections. The dimensions are such that the coupling is independent of light polarisation and residual thickness ($\delta$).

The coupler of FIG. 3a is shown in a practical form in FIG. 3b. The coupler according to FIG. 3 has the following properties:

(i) polarisation sensitivity is very low for a wide spread of waveguide parameters around the design values.

(ii) when polarization sensitivity is low, the sensitivity to waveguide parameters is also low. The change in confinement factor due to a rotation of the polarization is similar to that due to a change in waveguide rib height of 0.05 $\mu$m (see FIG. 2), and has a similar effect on the coupling. The effects of changing waveguide width and layer thickness have also been checked and found to be low.

(iii) the coupler is short, with a 'zero-gap' region length of ~40-50 μm.

Figure 4:
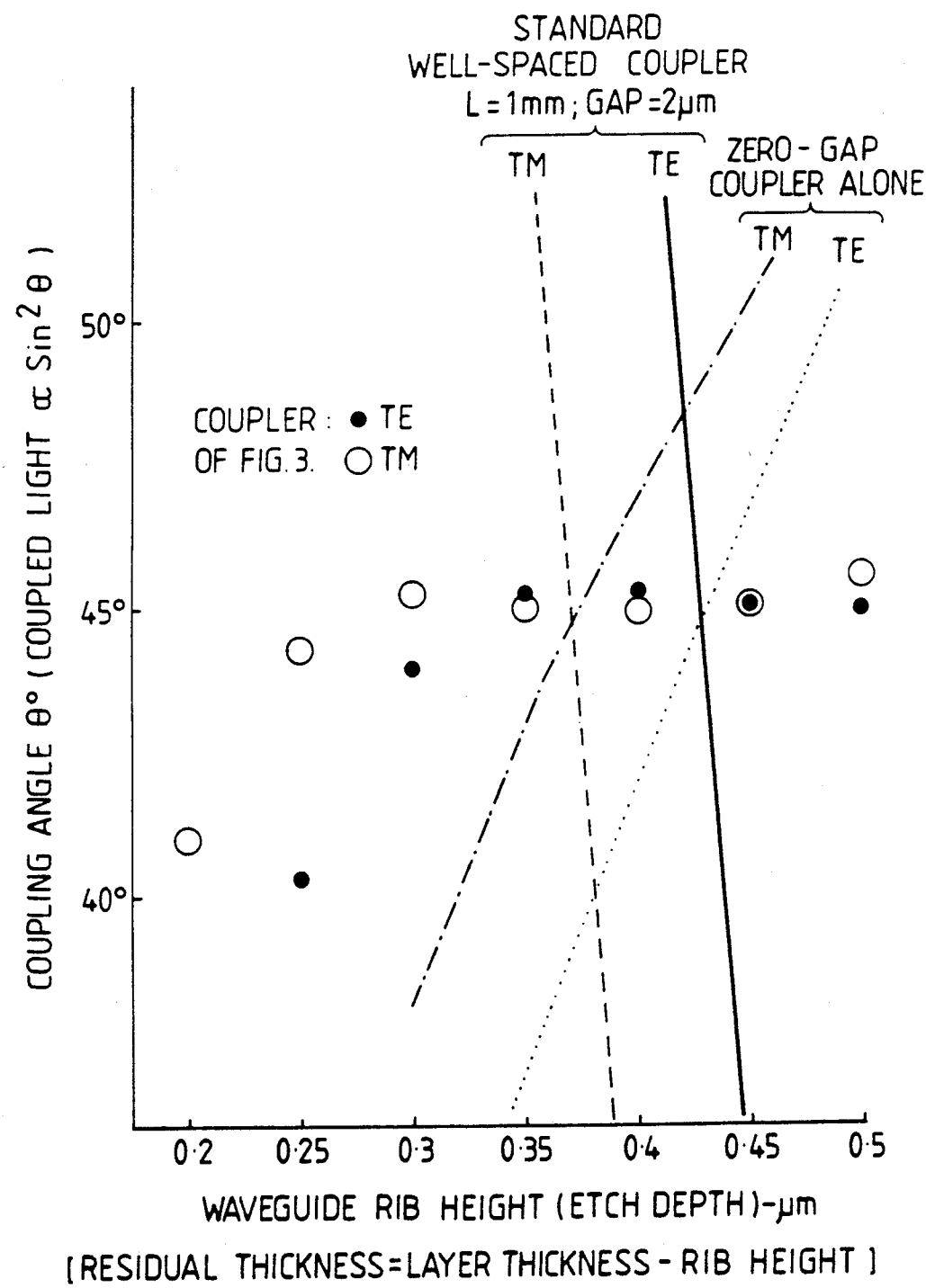
FIG. 4 is a graph illustrating the variation of coupling with waveguide rib height for the arrangement of FIG. 3.
Figure 6:
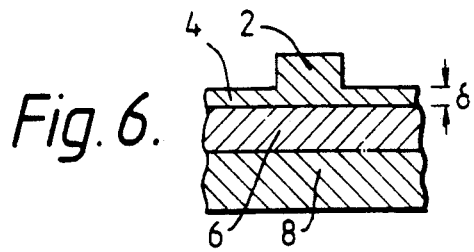
Figure 5:
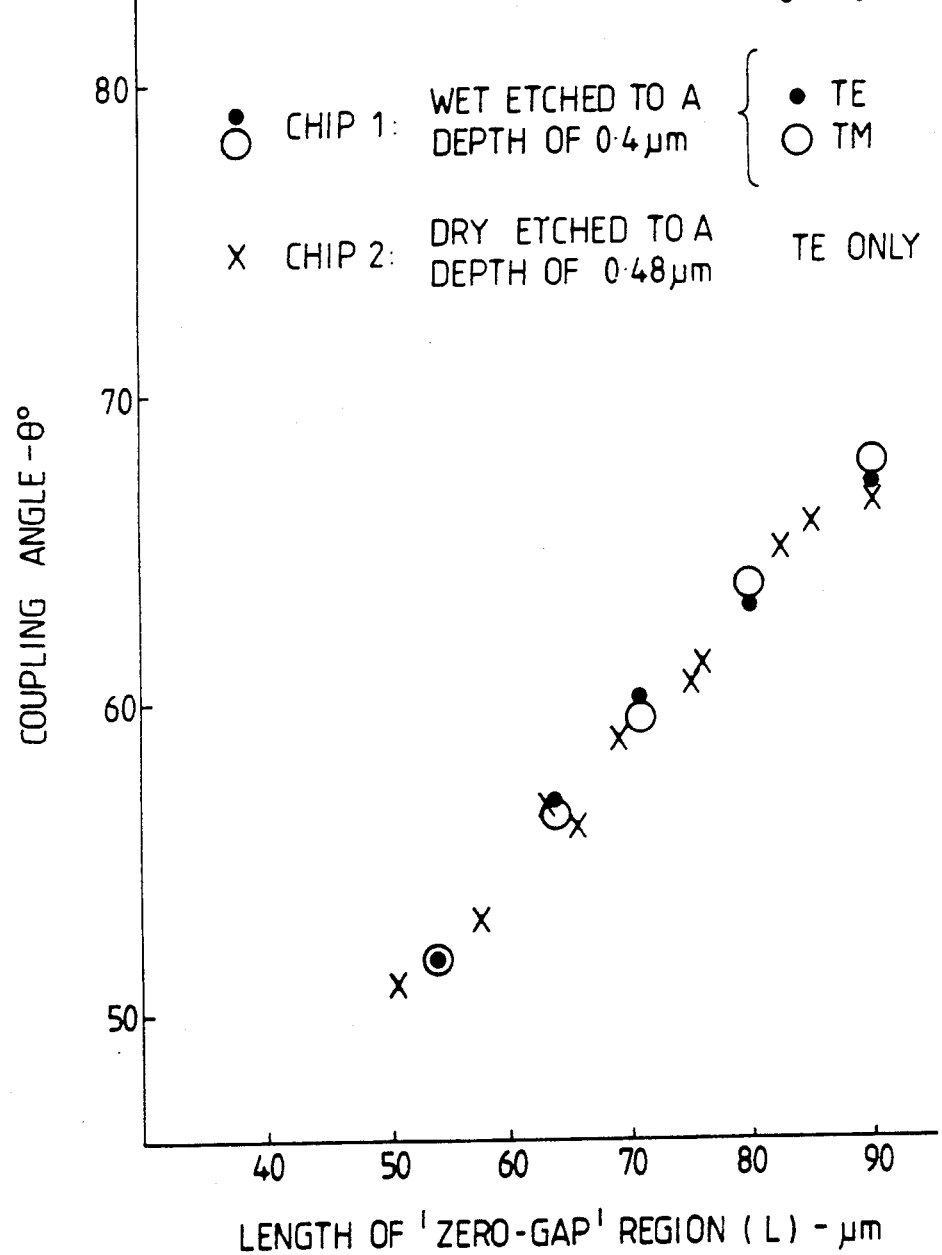
FIG. 5 is a graph illustrating the variation of coupling with length of single waveguide structure for the arrangement of FIG. 3; and, FIG. 6 is a schematic view of a known waveguide structure.

Experimental results have confirmed these predictions. FIG. 4 shows predicted, and FIG. 5 experimental results in terms of an effective coupling angle—$\theta$ (degrees). This angle is the argument of the sine-squared function which determines the coupled light level (e.g. 45° gives a 50:50 split). Polarization tolerance within 1° is achieved. Test chips processed and etched differently yielded nearly identical results even though the guide widths and profiles were very different.

I claim:

1. An integrated optical device including a directional coupler for transferring light energy between first and second waveguides having widths and electromagnetic field regions, the directional coupler including a first well-spaced region in which the first and second waveguides converge toward one another while the electromagnetic field regions associated with the waveguides interact, and a second zero-gap region having at least twice the width of either waveguide, said coupler having a transfer coupler length which, in the first region, exhibits a first dependence upon polarization with the transfer coupler length being shorter for transverse electric fields than for transverse magnetic fields, whereas in the second region, the transfer coupler length exhibits a second dependence upon polarization opposite to said first dependence, said first and second regions being dimensioned to control or eliminate the dependence of the directional coupler upon polarization of light in the waveguides.

2. An integrated optical device as claimed in claim 1, wherein the first region comprises areas on each side of said second region.

3. An integrated optical device as claimed in claim 1 wherein the first and second waveguides in said first region comprises arcuate sections which curve in opposite directions.

4. An integrated optical device as claimed in claim 1 wherein the waveguides are spaced about 1 μm at a boundary of the second region.